Patented June 24, 1952

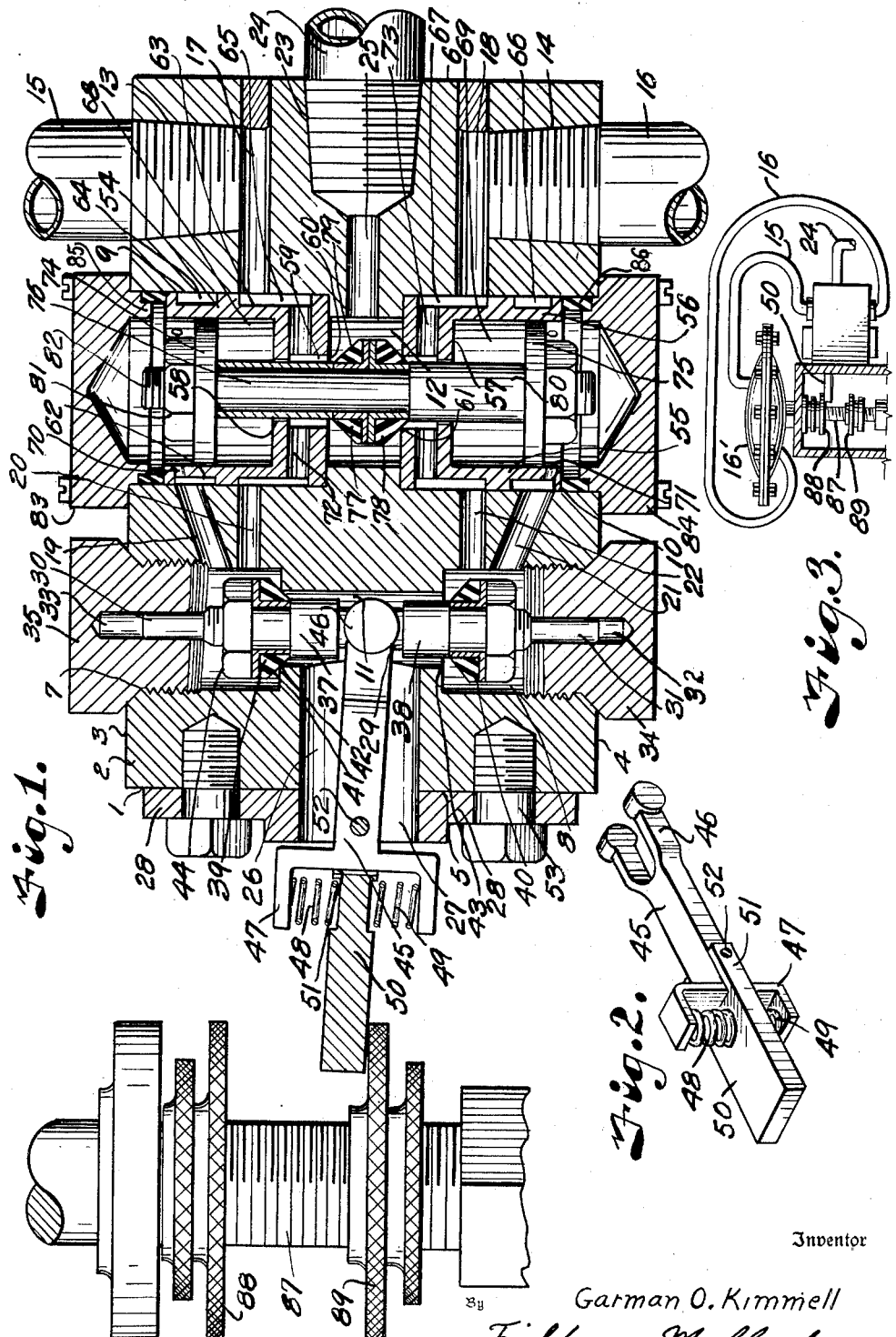

2,601,531

UNITED STATES PATENT OFFICE 2,601,531

FLUID ACTUATED CONTROL VALVE

Garman O. Kimmell, Oklahoma City, Okla., assignor to Black, Sivalls & Bryson, Inc., Kansas City, Mo., a corporation of Delaware Application May 15, 1948, Serial No. 27,333

4 Claims. (Cl. 121—126)

This invention relates to valves, particularly a fluid-actuated valve for delivering a pressure fluid to a plurality of points alternately as, for example, to the opposite ends of a double-acting cylinder, sides of a pressure diaphragm, or like device, and has for its principal objects to provide a valve of this character that is of simple construction, positive in operation and which is characterized by its ease of operation and that it has no dead center position.

Other objects of the invention are to provide a valve which is characterized by its ease of adjustment and to provide a toggling action on the trip lever for effecting rapid change in valve position.

In accomplishing these and other objects of the invention as hereinafter pointed out, I have provided improved structure, the preferred form of which is illustrated in the accompanying drawing wherein:

Fig. 1 is an enlarged section through a valve constructed in accordance with the present invention.

Fig. 2 is a perspective view of the trip lever.

Fig. 3 is a diagrammatic view of the valve mechanism associated with a fluid motor and valve rod actuated thereby.

Referring more in detail to the drawings:

1 designates a valve constructed in accordance with the present invention and which includes a valve body or housing 2. The valve body may be of any suitable shape but is shown in the drawing as of rectangular form to provide opposite side faces 3 and 4 and end faces 5 and 6. Opening inwardly of the body of the valve from the side faces 3 and 4 are opposed axially aligned recesses 7—8 and 9—10 which are respectively interconnected by axial passageways 11 and 12 of smaller diameter than the recesses which they connect. Also formed in the side faces 3 and 4 of the valve body are internally threaded bores 13 and 14 for connecting discharge pipes 15 and 16 that are adapted to be connected to the respective ends of a reciprocatory mechanism, for example, the ends of a pressure actuated cylinder, opposite sides of a diaphragm type actuator 16', as shown in Fig. 3, or similar device with which the valve is to be used. The bores 13 and 14 are connected with the respective recess 9 and 10 by ports 17 and 18 and the recess 9 and 10 are connected with the recesses 7 and 8 by pairs of spaced ports 19—20 and 21—22. Opening inwardly from the end face 6 of the valve body is an internally threaded bore 23 for connecting a pressure fluid supply pipe 24 and which connects with the passageway 12 through a port 25. The opposite face 5 of the valve body has an inwardly extending bore or passageway 26 that connects with the passageway 11 and provides an exhaust through a registering opening 27 of a bracket 28 later described.

Reciprocable in the passageway 11 is a stem 29 having ends 30 and 31 slidably mounted in bores 32 and 33 that are provided in plugs 34 and 35 which close the open ends of the recesses 7 and 8. The plugs 34 and 35 are preferably threaded into the open ends of the recesses as shown in the drawing.

Formed on the stem are spaced collars 37 and 38 for seating valve members 39 and 40 and which have tapered faces 41 adapted to alternately engage seats 42 and 43 that encircle the ends of the passageway 11. The valves are retained in position against the collars by nuts 44 that are threaded onto the valve stem. The valves are thus located within the recesses 7 and 8 and are adapted to alternately open and close the connections between the valve recesses and passageway 11 to control exhaust of the valve operating fluid as later described. The valve stem is adapted to be actuated under control of a trip lever 45 having a yoke-shaped head 46 engaging between the collars 37 and 38 of the valve stem. The opposite end of the lever terminates in a yoke 47 seating coil springs 48 and 49 on the respective sides of a lever 50. The lever 50 also has a yoke-shaped end 51 straddling the yoke 47 and which is pivotally connected with the lever 45 by a pin 52 extending transversely of the opening 27 and having its ends fixed to the bracket 28. The bracket 28 is mounted on the end face 5 of the valve body by cap screws 53. Engaged in the recesses 9 and 10 are liners 54 and 55, each having a cylindrical wall 56 and a closed bottom 57, the bottoms being provided with axial openings 58 which are counterbored as at 59 to provide valve seats 60 and 61 on the facing sides of the liner bottoms. The circumference of the respective liners are provided with spaced grooves 62 and 63 to provide annular passageways 64—65 and 66—67.

The passageways 64 and 65 are connected with piston chambers 68 and 69 through parts 70 and 71 that are formed within the liners and with the ports 19 and 20. The annular passageways 65 and 67 are connected by radial ports 72 and 73 with the counterbores 59. The passageways 64 and 66 are also connected with the ports 19—21.

Reciprocable in the respective piston chambers are pistons 74 and 75 mounted on the ends of a piston rod 76 which carries valving members 77 and 78. The valving members are provided with oppositely directed bevel faces 79 which are adapted to alternately engage the seats 60 and 61. The valving members are retained in fixed relation on the piston rod by sleeves 80 sleeved thereon and having one end bearing against a respective valving member and its opposite end against the piston, the parts being retained in assembly by nuts 81 mounted on the threaded ends 82 of the piston rod as shown in the drawing. The liners are retained in seated position within the recesses by caps 83 and 84 closing the outer open ends of the recesses, and having flanges 85 engaging within the recesses and seating gaskets 86 which are pressed against the ends of the liners to seal the joint.

The sleeves 80 have loose fits within the liners so as to not close flow of pressure fluid to the pistons during operation of the valve as later described. The trip lever 50 is operated by a part of the device to be controlled by the valve, for example, if a pressure cylinder, the piston rod or stem indicated at 87 in the drawing, in which case the rod or stem will be provided with threads for adjustably mounting collars 88 and 89 for engaging the respective sides of the lever arm 50 when the actuated piston reaches the ends of its stroke.

Assuming that the valve constructed as described is connected through the pipes 15 and 16 with the respective ends of the equipment to which an actuating fluid is to be alternately supplied for effecting movement, for example, of the piston rod or stem 87 and that the pipe 24 is connected with a source of gas or vapor supply, the operation is as follows:

With the parts in position shown in the drawing, pressure fluid is supplied through the port 25 to the passageway 12 and through the counterbore 59, radial ports 72, annular passageway 65 and port 17 to the pipe 15 for effecting movement of the piston rod 87.

Flow of pressure fluid from the passageway 12 is closed off from the opposite end of the cylinder since the valve 78 engages the seat 61. Pressure fluid also enters the inner end of the piston chamber 69. Pressure fluid also flows through the port 20 into the valve chamber or recess 7 and through the larger port 19, annular passage 64 and port 70 to equalize pressure on opposite sides of the piston 74. The piston 74 is thus retained in the position illustrated to maintain closure of the valve 78. The piston chamber 69 is vented on the respective sides of the piston 75 through the ports 21 and 22, valve chamber or recess 8, passageways 11 and 26 and opening 27. The pressure in the valve chamber 7 therefore retains the valve 39 in seated position and the valve 40 in unseated position. As the stem 87 begins its movement, the collar 89 moves from engagement with the lever 50 and as the stem reaches the end of its stroke the collar 88 engages the lever 50. A force is therefore applied on the lever 50 in a direction to cause the lever 45 to lift the valve 39 through engagement of the yoke 46 with the collar 37. The difference in pressure across the valve 39 and 40 resists the actuating force to compress the spring 49. When the difference in pressure on the respective sides of the valves 39 and 40 is balanced by the force on the spring 49 as applied on the lever arm 45, the valve 39 is lifted from its seat and the action is rapidly completed by expansion of the spring 49. With this arrangement there is a snap action effecting opening movement of the valve 39 so that the pressure in the valve chamber 7 is exhausted through the passageway 11, passageway 26, and opening 27 to atmosphere. Since the full capacity of the passageways and opening 27 are several times larger than the combined capacity of the openings 19 and 20, pressure in the valve chamber immediately falls to the pressure in the exhaust passageway. The pressure medium contained in the piston chamber on the outer side of the piston 74 then has free passage through the ports 70 and 19 to the valve chamber 7 where the pressure is dropped rapidly to the pressure in the exhaust passage 26. The rapid change in pressure sets up a difference in pressure across the piston 74 and since the piston area is greater than the area of the valves 77 and 78, the force acting on the underside of the piston 74 effects shifting of the piston 74 to lift the valve 78 from its seat 61, thereby closing entrance of pressure fluid to the ports 72, annular passageway 65 and port 17 to the pipe 15. That end of the actuated apparatus is then free to exhaust to atmosphere through the pipe 15, port 17, annular passageway 65, port 20, valve chamber 7, passageways 11 and 26 and opening 27. This venting is restricted by the passageway 20 only sufficiently to prevent rise of pressure in the valve chamber 7 substantially above the pressure in the exhaust passageway 26. With the change in position of the valves 39 and 40, gas or vapor under supply pressure is free to fill rapidly the piston chamber on the outside of piston 75 and valve chamber 8 through passageway 12, valve seat 61, radial ports 73, annular passageway 67, port 22, valve chamber 8, port 21, annular passageway 66 and ports 71. At the end of valve position change the pressure on the opposite side of the piston is at the same pressure as the pressure in the exhaust passageway 26 so that a difference in pressure is imposed across the piston 75 to further assist in change of position of the valves 77 and 78 and provides a holding force to maintain the change position of the valves. Pressure fluid then reaches the valve chamber 8 to maintain a pressure differential across the valve 40 which with the effort afforded by the spring 49 holds the valves 39 and 40 in changed position. The pressure fluid is now free to pass from the source of supply to the controlled equipment that is connected with the pipe 16, the fluid flowing through passageway 12, valve seat 61, radial port 73, passageway 67 and port 18. The pressure fluid will then effect movement of the rod 87 in the opposite direction to again reverse flow to the controlled equipment when the collar 89 actuates the trip lever 50. Like cycles of operation continue as previously described to continue alternate operation of the controlled equipment.

If desired, the valve as described may be adapted to two-way operation or to equipment requiring pressure fluid alternately to one point as in the case of a spring or weight-loaded piston or diaphragm. In this case one of the connections 13 or 14 may be plugged and the other connected with the equipment to be operated.

From the foregoing it is obvious that I have provided a valve mechanism which is of simple and inexpensive construction and adapted for positive control of a pressure fluid used in operating pressure cylinder diaphragms or similar equipment.

What I claim and desire to secure by Letters Patent is:

1. A valve of the character described including a valve body having a valve chamber provided with an inlet for a pressure fluid and coaxial outlets adapted for connection with a pressure fluid actuated device and having coaxial pressure chambers in connection with said outlets, valves in the valve chamber for controlling flow through the outlets, pistons in said pressure chambers and having connection with the valves to operate as a unit and alternately seat the valves in closing relation with the outlets, said valve body also having control valve chambers related to the pressure chambers and having flow connections with the outlets and with the pressure chambers at outer sides of the pistons and having coaxial exhaust ports, a control valve in each control valve chamber, means interconnecting the control valves for alternately closing one exhaust port and opening the other exhaust port, means for effecting actuation of the control valves so that when one of the first named valves is in position establishing flow of pressure fluid through the outlet and pressure fluid is admitted to the related pressure chamber on the respective sides of the piston by way of said related control valve chamber and flow connection when the control valve for that chamber is seated to render the pressure fluid effective on the device to be actuated and to equalize pressure on the respective sides of the related piston while the other of the first named valves is closing flow of pressure fluid to the other of said outlets and pressure fluid is exhausting from the device to be actuated to establish pressure on the other piston to hold the first named valves in said open and closed positions and to effect exhaust of pressure fluid from the device to be actuated and venting of the pressure fluid from the opposite sides of said other piston through the related control valve chamber having the unseated control valve, and means for alternately operating the control valves to effect alternate operation of said first named valves for reversing the flow of pressure fluid to and from the device to be actuated.

2. A valve of the character described including a valve body having a valve chamber provided with an inlet for a pressure fluid and coaxial outlets adapted for connection with a pressure fluid actuated device and having coaxial pressure chambers in connection with said outlets, valves in the valve chamber for controlling flow through the outlets, pistons in said pressure chambers and having connection with the valves as a unit to alternately seat the valves in closing relation with the outlets, said valve body also having control valve chambers related to the pressure chambers and having flow connections with the outlets and flow connections of larger capacity with the pressure chambers at outer sides of the pistons and having coaxial exhaust ports, a control valve in each control valve chamber, means interconnecting the control valves for alternately closing one exhaust port and opening the other exhaust port, means for effecting actuation of the control valves so that when one of the first named valves is in position establishing flow of the pressure fluid through the outlet and fluid is admitted to the related pressure chamber on the respective sides of the piston by way of said related control valve chamber and flow connections when the control valve for that chamber is seated to render the pressure fluid effective on the device to be actuated and to equalize pressure on the respective side of the related piston while the other of the first named valves is closing flow of pressure fluid to the other of said outlets and pressure fluid is exhausting from the device to be actuated to establish pressure on the other piston to hold the first named valves in said open and closed positions and to effect exhaust of pressure fluid from the device to be actuated and venting of the pressure fluid from the opposite side of said other piston through the related control valve chamber having the unseated control valve, and means for alternately operating the control valves to effect alternate operation of said first named valves for reversing the flow of pressure fluid to and from the device to be actuated.

3. A valve of the character described including a valve body having a valve chamber provided with an inlet for a pressure fluid and outlets for the pressure fluid, a valving member for each of said outlets, means interconnecting the valving members and alternately closing said outlets, pistons connected with said valves, said valve body having control valve chambers connected with said outlets through interconnecting ports and with opposite sides of the pistons through larger ports to effect rapid exhaust through the larger ports into the control chambers, said control chambers having exhaust ports, control valves for the exhaust ports, a stem interconnecting the control valves, spaced collars on the stem, a trip lever having a yoke engaged between said collars and adapted to shift the stem to alternately seat one of the control valves and unseat the other control valve for effecting operation of the valving members.

4. A valve of the character described including a valve body having a valve chamber provided with an inlet for a pressure fluid and coaxial outlets for the pressure fluid and having pressure chambers coaxial with said outlets, actuators in said pressure chambers, a stem connecting the actuators, valving members on said stem to close one outlet when the other is open, said valve body having control valve chambers respectively connected with said outlets on the side of said valving members in direction of flow through the outlets and with said pressure chambers for supplying pressure medium to the pressure chambers, exhaust valves in said control chambers for controlling exhaust ports in the control chambers, a stem interconnecting the exhaust valves, spaced collars on the stem, a trip lever having a yoke engaged between said collars and adapted to alternately seat one of the exhaust valves to render the pressure fluid effective in one of the pressure chambers and unseat the other control valve to exhaust pressure fluid from the other pressure chamber.

GARMAN O. KIMMELL.

REFERENCES CITED

The following references are of record in the file of this patent:

UNITED STATES PATENTS

| Number | Name | Date |
|---|---|---|
| 50,218 | Cameron | Oct. 3, 1865 |
| 335,855 | Toole | Feb. 9, 1886 |
| 358,804 | Cresswell | Mar. 1, 1887 |
| 400,919 | Keplinger | Apr. 9, 1889 |
| 485,046 | Laney | Oct. 25, 1892 |
| 1,058,804 | Stevens | Oct. 15, 1913 |
| 2,208,421 | Hanna | July 16, 1940 |
| 2,451,449 | Sacchini | Oct. 12, 1948 |